United States Patent [19]

Pigott

[11] Patent Number: 4,941,407
[45] Date of Patent: Jul. 17, 1990

[54] AUTOMATED GUIDED VEHICLE SYSTEM

[75] Inventor: Norman B. Pigott, Bishop's Stortford, England

[73] Assignee: Litton U. K. Limited, United Kingdom

[21] Appl. No.: 175,109

[22] Filed: Mar. 30, 1988

[30] Foreign Application Priority Data

Apr. 1, 1987 [GB] United Kingdom ................ 8707790

[51] Int. Cl.⁵ ............................................ B60L 11/12
[52] U.S. Cl. ..................................... 104/289; 104/295
[58] Field of Search ........................ 105/30, 49, 50, 61; 104/168, 288, 289, 295, 304; 180/168, 131

[56] References Cited

U.S. PATENT DOCUMENTS

| | | | |
|---|---|---|---|
| 3,164,103 | 1/1965 | Lathers et al. | 105/30 X |
| 3,169,733 | 2/1965 | Barrett, Jr. | 104/288 X |
| 3,537,402 | 11/1970 | Harkess | 104/168 |
| 3,807,312 | 4/1974 | Flodell | 105/30 X |
| 3,847,085 | 11/1974 | Rypinski | 105/50 X |
| 3,848,535 | 11/1974 | Mitchell | 104/168 X |
| 3,886,869 | 6/1975 | Tantlinger | 105/30 |
| 4,090,452 | 5/1978 | Segar | 104/288 X |
| 4,258,813 | 3/1981 | Rubel | 180/168 |
| 4,515,235 | 5/1985 | Yamamoto et al. | 180/168 |
| 4,570,543 | 2/1986 | Ishikura et al. | 105/50 X |

FOREIGN PATENT DOCUMENTS

| | | | |
|---|---|---|---|
| 1455008 | 10/1969 | Fed. Rep. of Germany | 104/168 |
| 2531057 | 1/1977 | Fed. Rep. of Germany | 180/168 |
| 2305329 | 10/1976 | France | 104/288 |
| 56403 | 4/1980 | Japan | 105/50 |

Primary Examiner—Margaret A. Focarino
Assistant Examiner—Joseph D. Pape
Attorney, Agent, or Firm—Oldham & Oldham Co.

[57] ABSTRACT

An automated guided vehicle system wherein a vehicle has an on-board motive power source utilized for driving the vehicle over untracked portions of its path of movement between work stations on an assembly line, the vehicle being guided over these path portions by guidance signals, and the vehicle is guided through the work stations by a track from which it derives motive power for driving the vehicle at higher speeds and power for replenishing storage battery means on-board the vehicle (FIGS. 1 and 2).

5 Claims, 8 Drawing Sheets

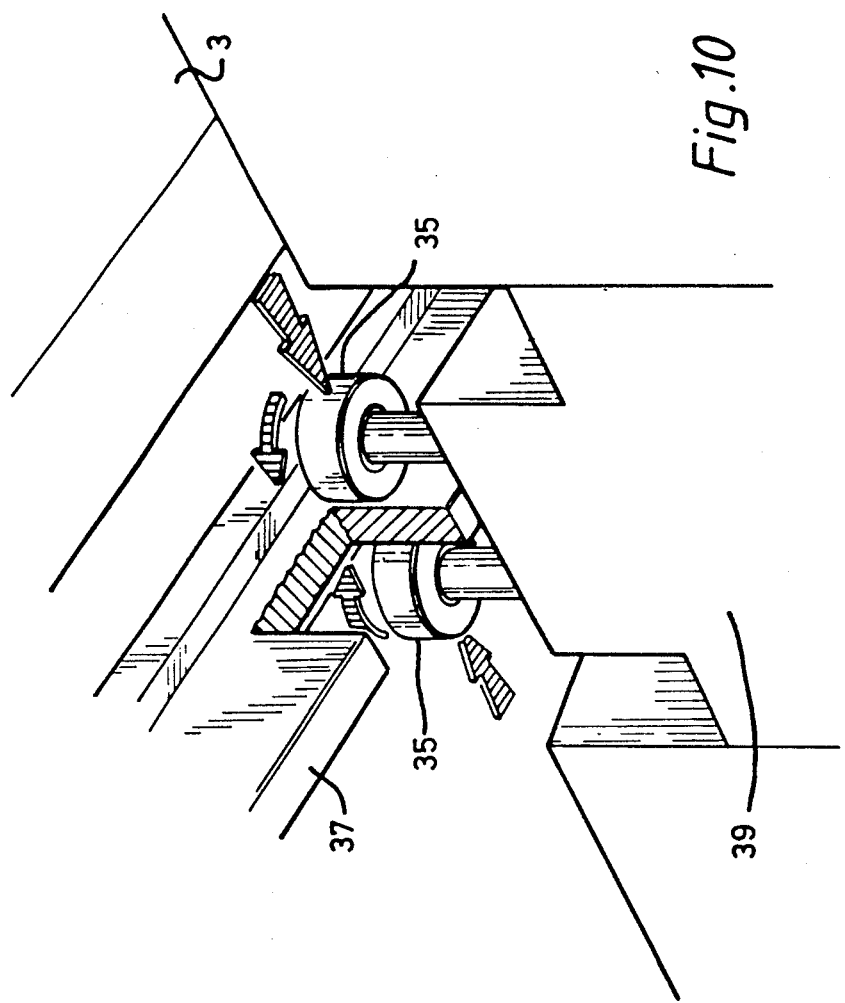

AUTOMATED GUIDED VEHICLE SYSTEM

FIELD OF THE INVENTION

The present invention relates to automated guided vehicle systems. It has application, for instance, in assembly lines such as for motor vehicles.

BACKGROUND OF THE INVENTION

Assembly line systems are known in which the object being assembled (e.g. a motor vehicle) is carried on an automated guided vehicle through a number of work stations on a shop floor, so that operations can be carried out on the article being assembled at the respective work stations. Guidance systems such as rails and/or buried guide wires control the path followed by the automated guided vehicle as it moves between the work stations.

SUMMARY OF THE INVENTION

In one aspect, the present invention is concerned with the way in which the automated guided vehicle is given motive power. According to the invention in this aspect, the vehicle is driven in two different manners into respective portions of its path. The vehicle has a supply of power on-board, such as electric batteries, and over one said portion of its path it receives no motive power from any external source. Over this portion of its path the vehicle moves by obtaining motive power from its on-board supply. In the other portion of its path, the vehicle receives motive power from an external source.

This externally supplied motive power may be in the form of energy, such as electricity from external contacts, or it may be in the form of a motive force applied directly to the vehicle such as from driven rollers.

Typically, the vehicle will move relatively fast when it is moving under the externally supplied motive power and will move relatively slowly when it is relying on its onboard supply.

It is advantageous if the on-board supply of motive power is replenished as the vehicle travels over that portion of its path in which it receives motive power from an external source.

Frequently, the complete path of such an automated guided vehicle will contain a plurality of each type of portion as its path.

In a second aspect, the present invention relates to the guidance system for the vehicle. In this aspect, the present invention provides a system in which over a first portion of its path the vehicle receives guidance signals but its movement is not physically constrained so that it is necessary for the vehicle to follow the path by determining its direction of travel itself. In a second portion of its path, a track is provided for the vehicle which track physically constrains the vehicle to follow the path. Typically, the vehicle will continue to receive guidance signals even along the portion of its path having the track. Frequently, over the total length of the path of the automated guided vehicle there will be a plurality of each type of portion of the path.

The two aspects of the present invention reFerred to above can advantageously be combined so that the portions of the path for the vehicle without a physically constraining track are also those portions over which the vehicle receives no external motive power. Conversely, the physically constraining track may also perform a function in the driving of the vehicle when it receives external motive power, such as providing a reaction surface for driven rollers on the vehicle or by providing driven rollers to act on a reaction surface on the vehicle.

In an assembly line an article to be assembled might pass through a plurality of work stations which are arranged in groups. An automated guided vehicle carrying an article to be assembled might be driven through the work stations of one group at relatively high speed along a physically constraining track, typically under the control of a computer associated with that group of work stations. The vehicle might then move at a relatively low speed under its own power and without physically constraining tracks from one group of work stations to the next. In this manner, the area between groups of work stations can be kept free of tracks and motive power supplies for the vehicles. This can be advantageous, for instance if other types of vehicles or human personnel need to cross such areas from time to time.

Embodiments of the present invention, given by way of nonlimiting example, will now be described with reference to the accompanying drawings in which:

FIG. 1 is a schematic overview of part of a path network with a plurality of automated guided vehicles, embodying the present invention:

FIG. 2 s a schematic view of a vehicle according to a first embodiment of the present invention:

FIG. 10 is a view equivalent to FIG. 5, but from a different angle, for the embodiment of FIG. 7.

DETAILED DESCRIPTION OF THE DRAWINGS

Figure 1:
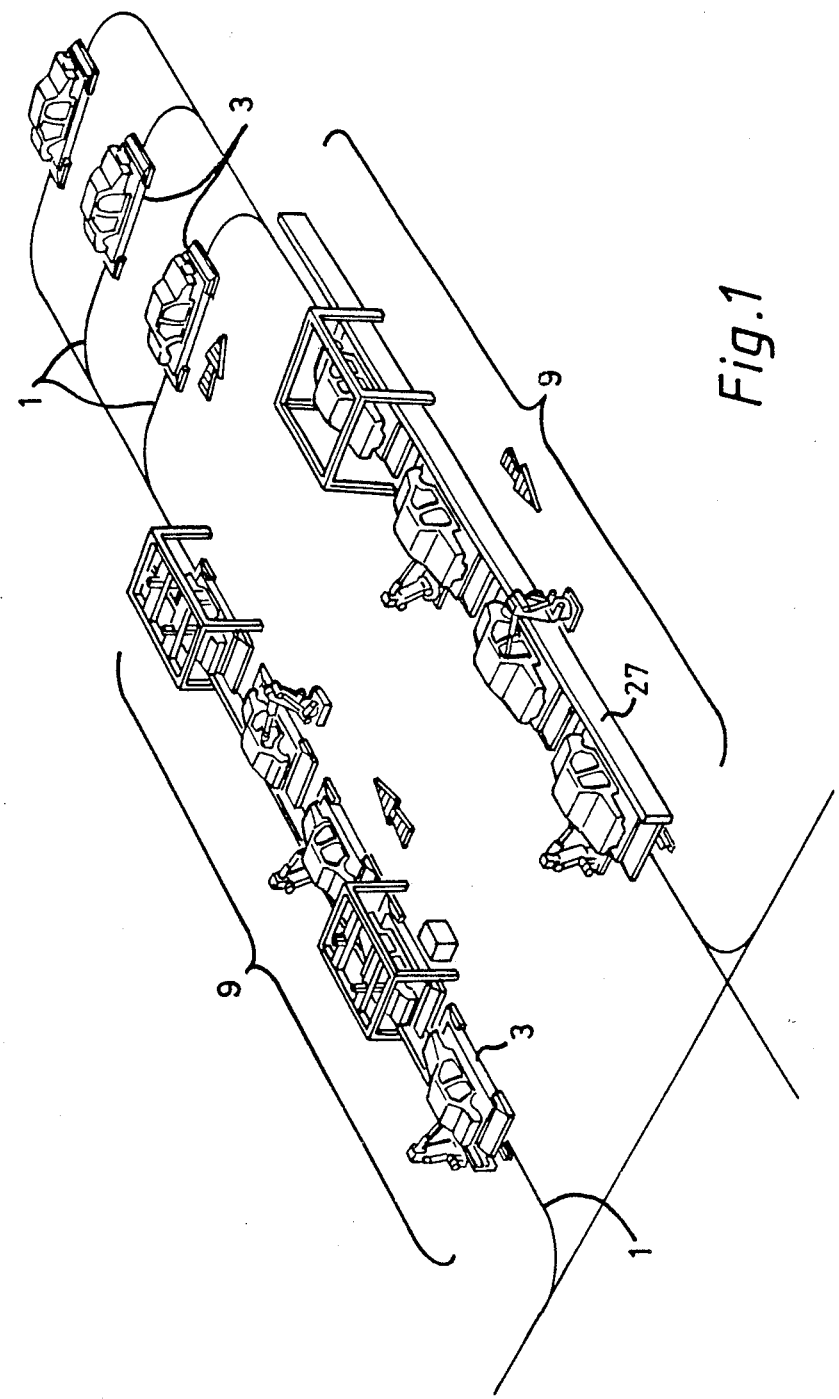
Figure 2:
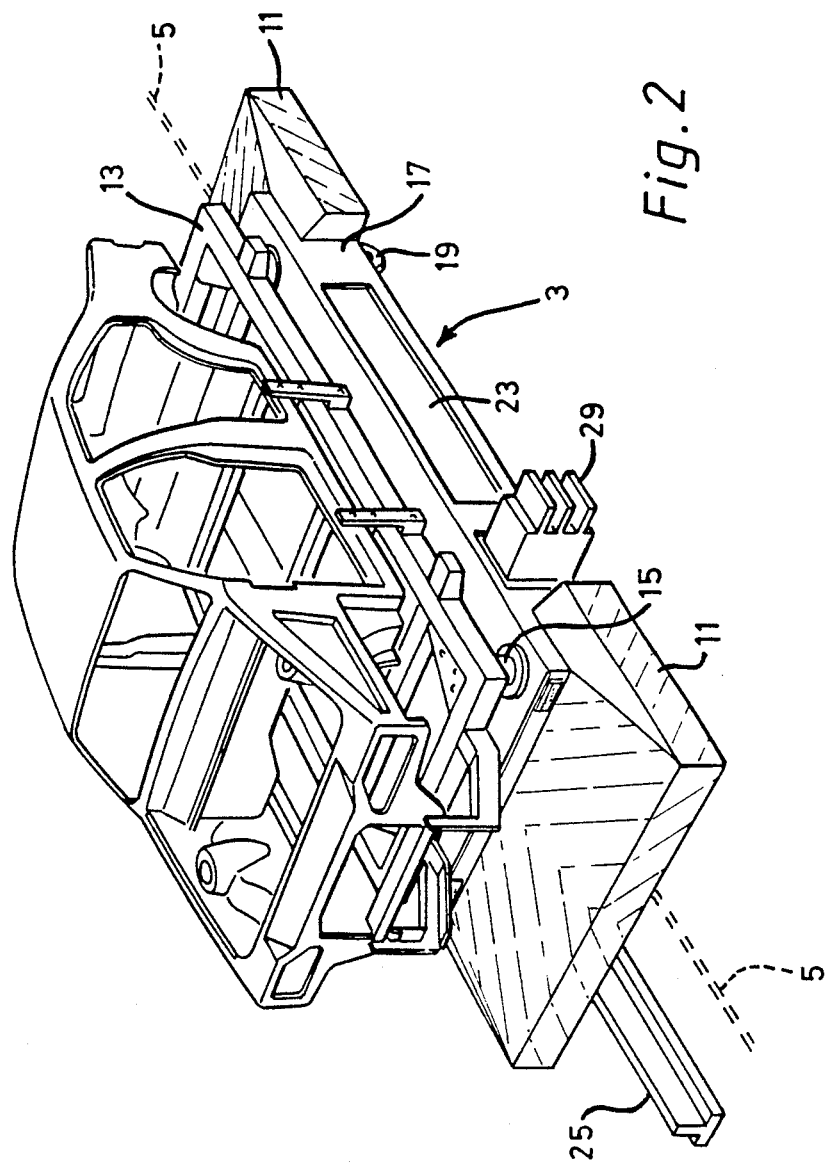
Figure 3:
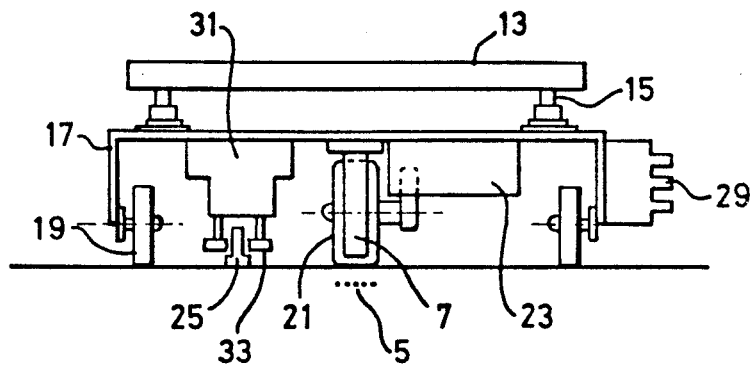
FIG. 3 is a schematic front view of the vehicle of FIG. 2 with its front and rear safety buffers removed.
Figure 4:
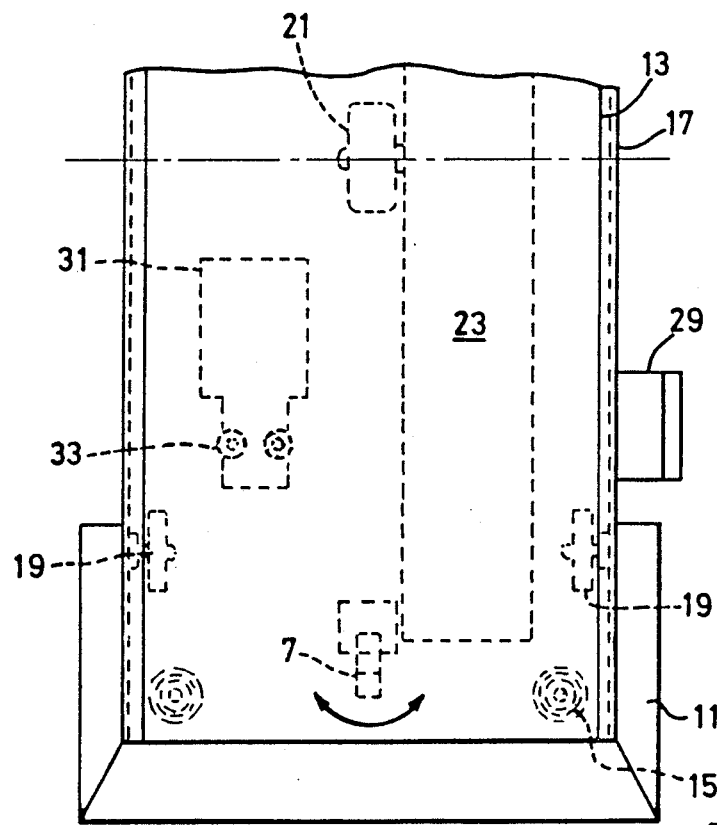
FIG. 4 is a schematic top view of the forward part of the vehicle of FIG. 2.
Figure 5:
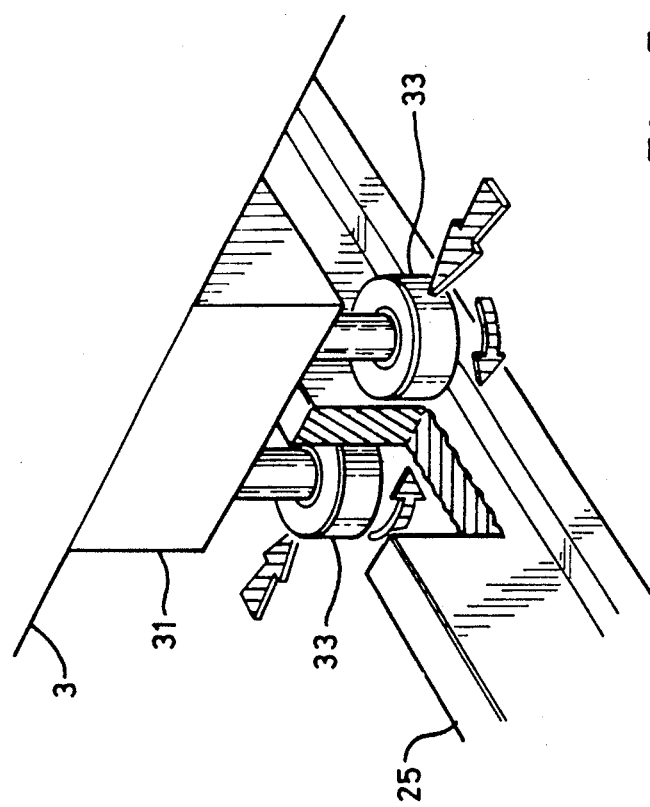
FIG. 5 is a schematic detailed view of the drive system of the vehicle of FIG. 2 which is used when the vehicle receives motive power from an external source.
Figure 6:
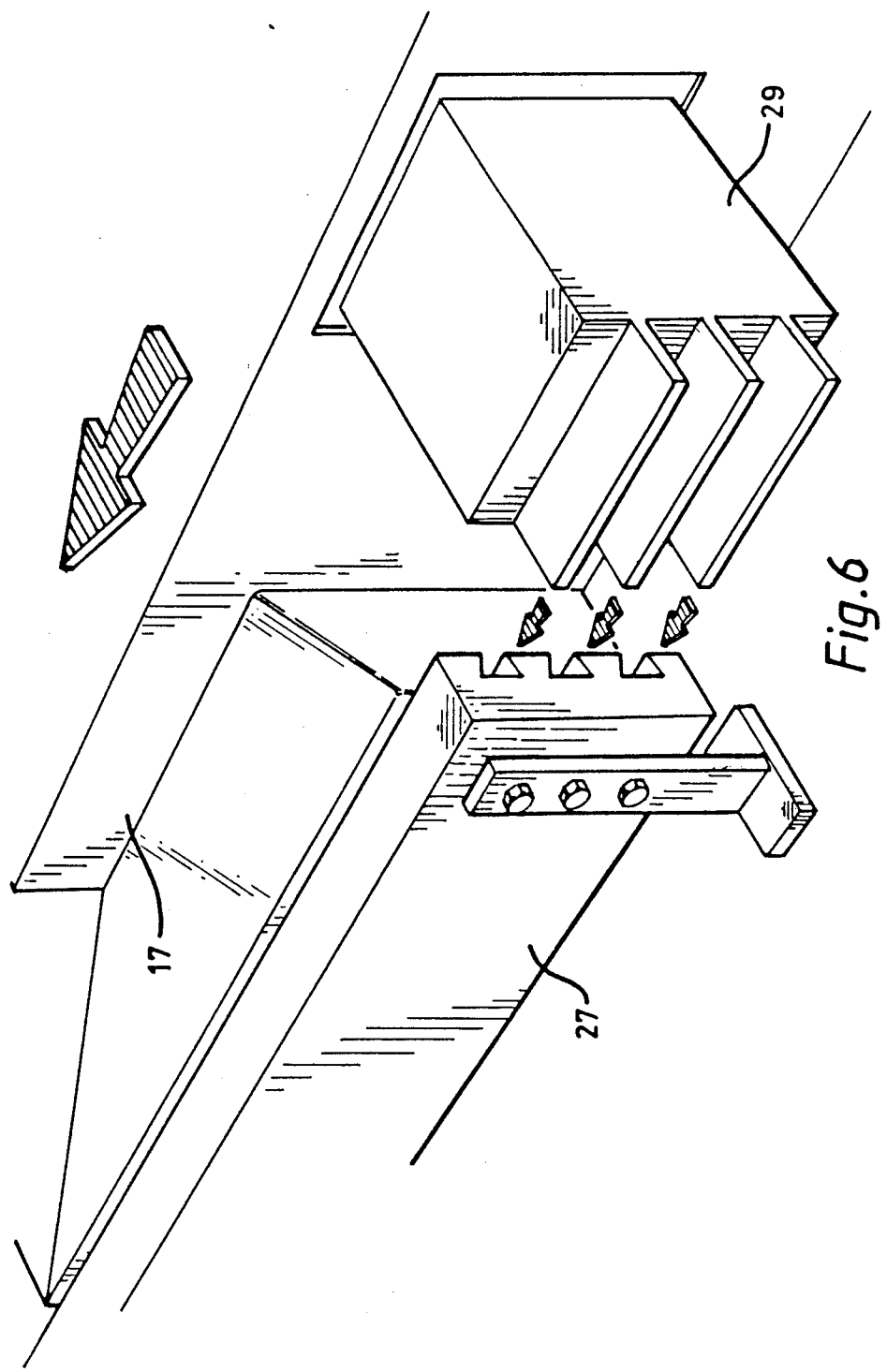
FIG. 6 is a schematic view showing the pick up system for the externally supplied motive power for the vehicle of FIG. 2.
Figure 7:
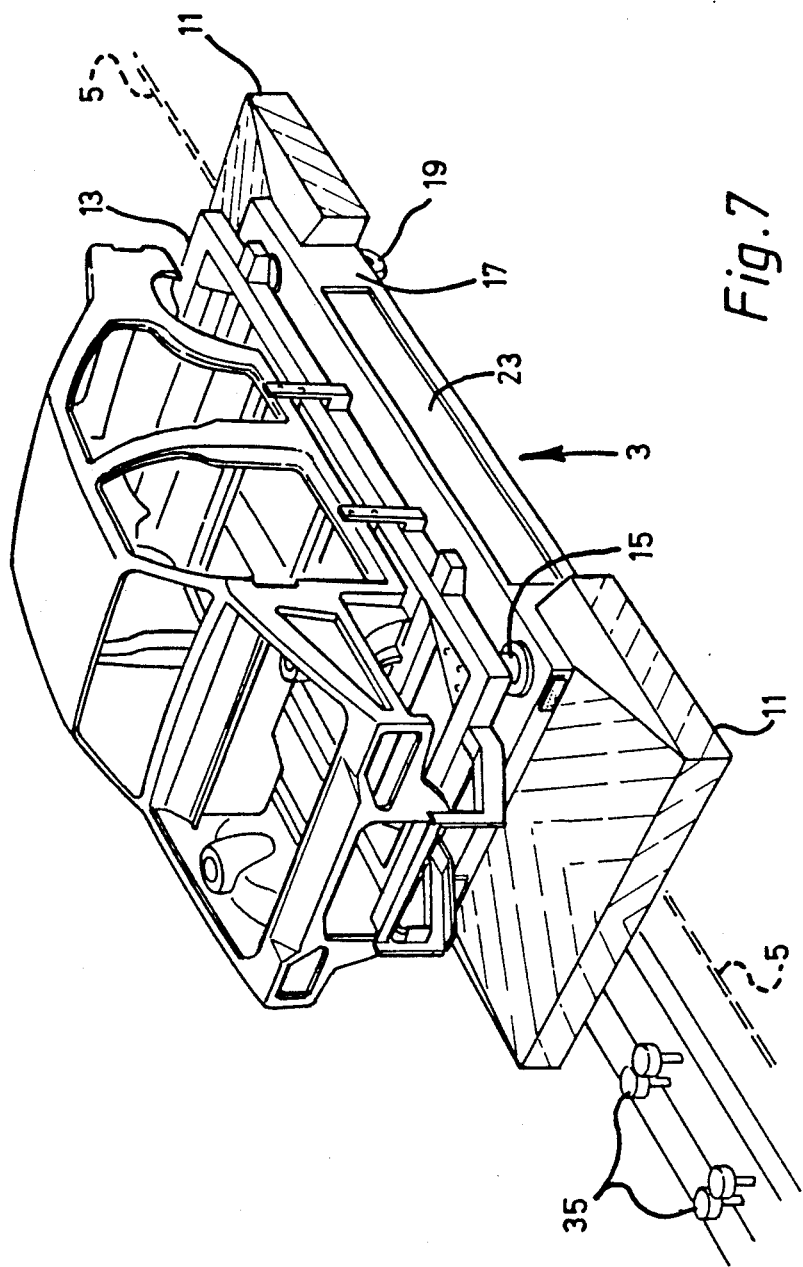
FIG. 7 is a view equivalent to FIG. 2 for a second embodiment of the present invention.
Figure 8:
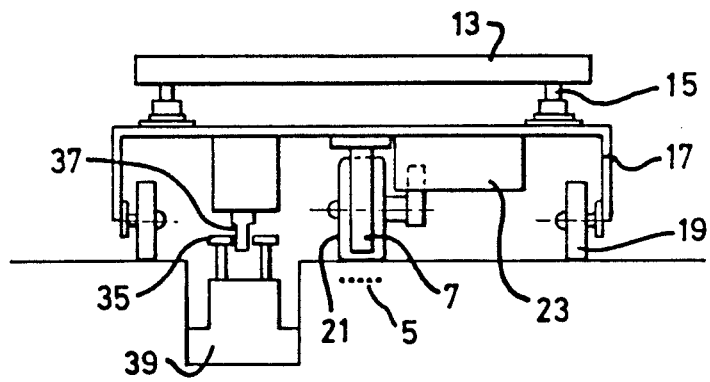
FIG. 8 is a view equivalent to FIG. 3 for the embodiment of FIG. 8.
Figure 9:
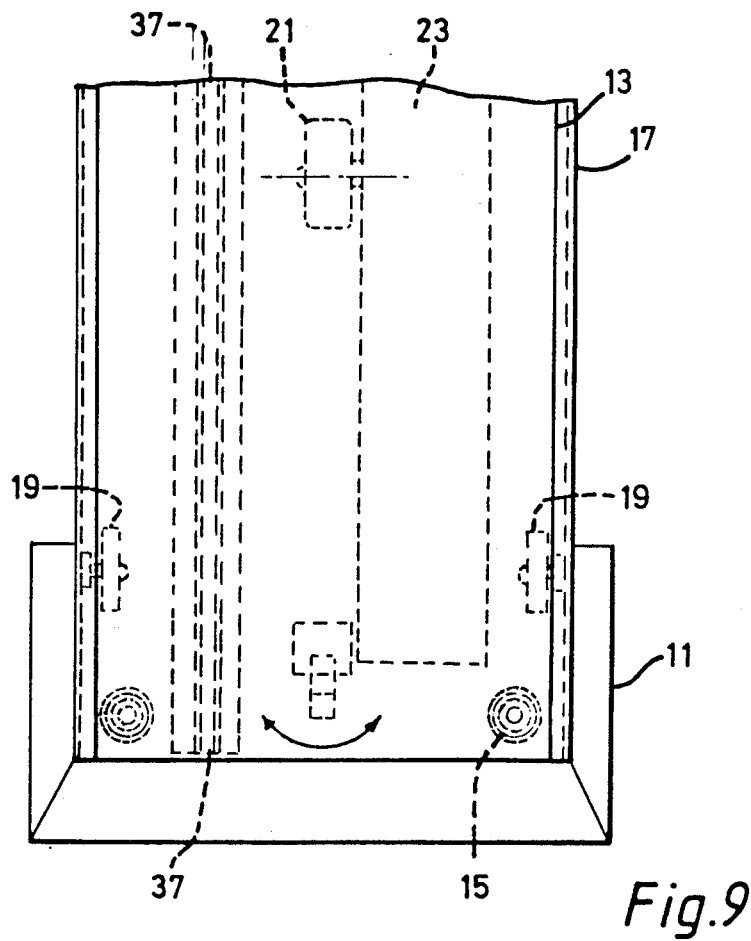
FIG. 9 is a view equivalent to FIG. 4 for the embodiment of FIG. 7.

FIG. 1 shows part of a path network for an automated guided vehicle in a motor car assembly line. The paths 1 in the network are defined by buried guide wires, from which the automated vehicles 3 obtain guidance for signals. The buried wires may provide these guidance signals in a passive manner, i.e. the vehicles detect the presence of the wires and follow them. without the wires providing any signal beyond their mere presence. Alternatively, the wires may provide guidance and/or control signals in an active manner, which signals could be picked up for example by electro-magnetic transducers on the vehicles. Buried wire guidance systems are known in the art. The wires 5 and the wire-detecting sensor means 7 on the vehicles 3 are best seen in FIGS. 3 and 8.

In FIG. 1, two groups 9 of work stations are shown. A vehicle 3 will carry a motor car body shell through the stations of first group, then from the first group to the second group, and then through the stations of the second group. Along the length of each group, the vehicle 3 receives motive power from an external source, and its motion is physically constrained by a track provided at the floor along the length of the group 9 of work stations. Between the groups, the vehicles 3 move only by means of their on-board motive power supply, and are guided by the buried wires without being physically constrained by any track.

The vehicles 3 have safety buffers 11 at either end. A frame 13 for carrying a motor car body shell or other article to be assembled is supported by pillars 15 on a vehicle main body 7. The main body 17 is supported on the floor of the assembly line principally by freely rotating wheel 19 mounted at either side of the body near its front and rear ends. The guide wire sensing means 7 is mounted near the front of the main body, and centrally across the width of the vehicle. A further floor contacting wheel 21 is provided near the centre of the vehicle 3. This is a drive wheel which is used to propel the vehicle 3 along those portions of the path where there is no track and no external supply of motive power. The vehicle carries electric storage batteries 23 which power an electric motor to drive the wheel 2 over these portions of the path. The preceding general description of the automated guided vehicle is common to both embodiments, and the parts described are best shown in FIGS. 3, 4, 8 and 9.

In the embodiment of FIGS. 2 to 6 the physically constraining track takes the form of a guide rail 25 mounted on the floor. The externally supplied motive power is supplied in the form of electricity, from a supply board 27 (see FIGS. 1 and 6) mounted alongside the track. The vehicle 3 carries a power collector 29 which cooperates with the electric supply board 27 while the vehicle 3 travels over the rail 25. The electricity collected by the power collector 29 is used to power a further electric motor 31 mounted on the vehicle 3. The motor 31 drives horizontally extending (vertical axis) rollers 33 which press against either side of the floormounted rail 25. The reaction between the rollers 13 and the rail 25 drives the vehicle along this portion of its path.

Since the vehicle 1 is receiving a supply of electric power to drive the motor 31 as it passes over the portions of its path having the physically constraining track (in the form of the rail 25), it may be convenient to provide means to recharge the batteries 23 as the vehicle passes along these portions of its path.

In the embodiment of FIGS. 7 to 10, the externally supplied motive power is not supplied to the vehicle in the form of electricity. Instead, it is supplied in the form of a motive force applied directly to the vehicle. In this embodiment, the physically constraining track takes the form of a line of pairs of horizontally extending rollers 35 mounted just above the floor level of the assembly line. The vehicle 3 has a rail 17 which passes between them by the rollers 35 of each pair. The vehicle 3 does not carry an additional electric motor 31. Instead, the rollers 35 are driven by motors 39 arranged beneath them.

Because the vehicle 3 does not have a further electric motor 31 in this embodiment, it is not necessary to provide a power collector 29 on the vehicle and an electric supply board 27 alongside the track. Nevertheless, it may be convenient to provide a system for supplying the vehicle 3 with electricity as it passes along those portions of its path where it receives external supplied motive power, in order to recharge the batteries 23 carried on the vehicle. Alternatively, no provision may be made for recharging the batteries while the vehicle 3 is travelling on the path 1, and the batteries may be replaced or recharged periodically while the vehicle is being stored, serviced or otherwise not in use.

As can be seen from FIG. 1, there will typically be several vehicles 3 travelling in succession along the same path 1. Conveniently, while the vehicles 3 are passing a group 9 of work stations the movement of the vehicles 3 along the path 1 is controlled by a line computer associated with that group of work stations, so as to move the vehicle 3 in accordance with the needs of the work stations. Preferably the vehicles are moved between the work stations relatively quickly. This is easily provided as the external supply of motive power can be arranged to supply large amounts of motive power. In the embodiment of FIGS. 7 to 10, each pair of driven rollers 35 may be controlled and driven independently, or the pairs of rollers may be in groups which are driven and controlled together but independently of the rollers of other groups, rather than driving all the rollers associated with one group 9 of work stations under a common control. This division of the rollers into independently driven pairs or groups can allow the vehicles 3 to be driven past the work stations of a group 9 in a more flexible manner.

I claim:

1. A vehicle assembly line having an automated unmanned vehicle guidance system, said system comprising, in combination with the unmanned vehicle;
   a plurality of discrete physically constraining track portions for guiding a vehicle having the ends thereof spaced apart,
   at least one path for vehicle movement which does not have any physically constraining track and which extends between at least one of said physically constraining track portions and at least one end of another of said physically constraining track portions,
   means whereby said vehicle receives driving power from an external power source at the location of said track portions to move said vehicle at a first selected speed along the physically constraining track portions,
   a power source on-board the vehicle to provide driving power for moving the vehicle at a second selected speed slower than the first selected speed along the path which does not have any physically constraining track between said track portions, and
   means whereby the vehicle receives direction guidance signals during movement along the at least one path not having any physically constraining track whereby to cause said vehicle to be moved by said on-board power source between said physically constraining track portions.

2. A system according to claim 1, wherein
   said external source provides mechanical driving power to said vehicle at the location of said track portions.

3. A system according to claim 2, wherein
   said mechanical driving power is provided by driven rollers cooperating with a reaction surface on said vehicle.

4. A system according to claim 2, wherein
   means are provided whereby said power source on-board said vehicle is replenished as the vehicle travels over said track portions.

5. A system according to claim 1, wherein
   said vehicle derives motive power from said external source through said track portions.

* * * * *